June 20, 1933.  W. R. EDDINGTON  1,914,686
METHOD OF STANDARDIZING PEAS
Filed Dec. 29, 1930
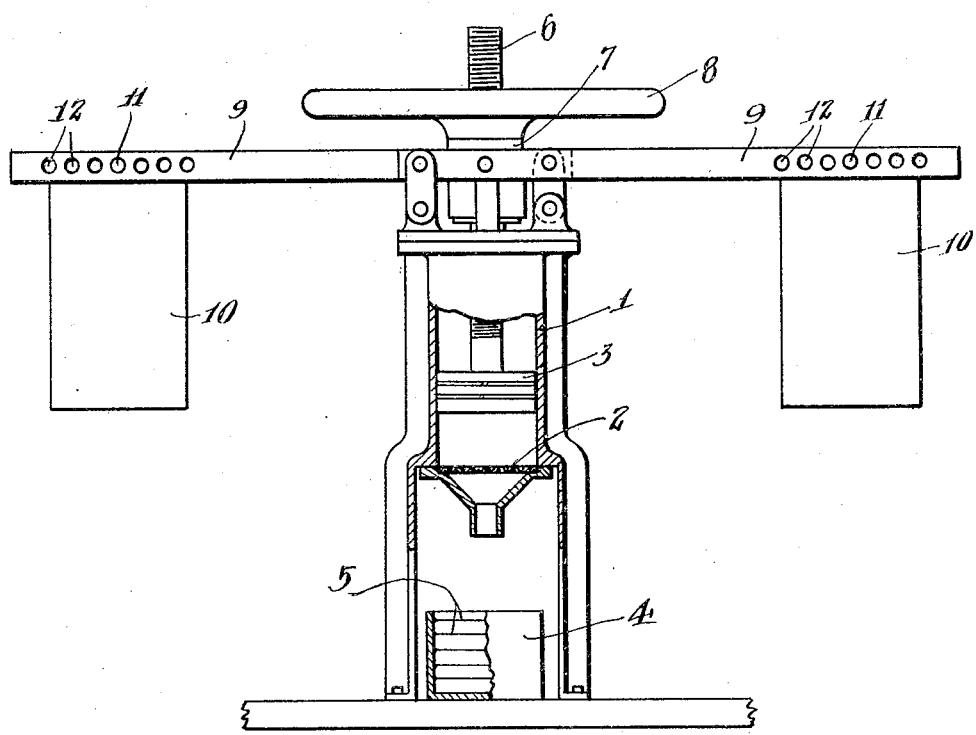
Inventor
William R. Eddington
By Lyon & Lyon
attys Patented June 20, 1933

1,914,686

UNITED STATES PATENT OFFICE

WILLIAM R. EDDINGTON, OF SPRINGVILLE, UTAH, ASSIGNOR TO CALIFORNIA PACKING CORPORATION, OF SAN FRANCISCO, CALIFORNIA, A CORPORATION OF NEW YORK

METHOD OF STANDARDIZING PEAS

Application filed December 29, 1930. Serial No. 505,217.

This invention relates to the method of standardizing vegetables, and more particularly is directed to a method of standardizing vegetables such as peas and the like by means of determining their moisture content. Heretofore, prior to my invention, there has been no reliable method by which the quality of vegetables delivered to a packing plant might be determined. The quality of the vegetables delivered to the packing plant determines the quality of the canned product produced at the packing house, and therefore determines the price the canned goods will bring on the market. For quality vegetables, such as peas, the canner is able to pay the grower a better price because he is able to obtain a better price. For goods of inferior quality, the canner must reduce the price paid to the grower or he is not able to handle this type of produce as he is not able to dispose of it in the market in competition with the quality products.

I have found that vegetables may be standardized and their quality determined accurately, particularly in the case of peas, by determining the moisture content of the peas, and that a fair basis of remuneration for the grower may be worked out upon the moisture extractable from the peas under determined conditions.

It is therefore an object of my invention to provide a method for the standardization of vegetables, particularly peas, by determining the moisture content of such vegetables.

Another object of my invention is to provide a method of standardizing vegetables such, for example, as peas by the subjecting of a determined quantity of such vegetables to a predetermined pressure and draining from the compressed vegetable for a predetermined time the moisture liberated by the pressure.

Other objects and advantages of this invention it is believed will be apparent from the following detailed description of a preferred embodiment thereof.

In the drawing there is diagrammatically illustrated a form of apparatus used in carrying out the process and method embodying my invention.

The apparatus and process embodying my invention is fully set forth and described in my co-pending application filed March 3, 1930, Serial No. 432,760 for Juice press.

In accordance with the preferred method of carrying out the process embodying my invention, a sample of the vegetable to be standardized, for example, a twelve ounce representative sample of the peas, is taken and is subjected to a pressure of approximately 120 pounds per square inch, and this pressure is maintained upon the peas for a period of time, for example, thirty seconds. The pressure is then released from off the peas and the peas are allowed to drain for another period of time, for example, a further period of thirty seconds. The juice recovered by this method is measured, for example, in cubic centimeters and the more tender the peas, the more juice obtained.

It is generally recognized that in any method of standardization it is not safe to rely upon one such test and in the case of peas and other vegetables, we have found that there will be a wide range in quality between the vegetables or peas within a given load. The top part of the load may be of more or less matured vegetables than the other portions of the load, and we prefer therefore to take about three samples from every delivery and to run three tests thereof taking an average to determine the grade of the vegetables or peas.

I have found through extended experimentation that the pressure that should be used for the purpose of extracting the juice from the peas is approximately 120 pounds per square inch. I have found that where a lesser pressure is used, all of the juice is not extracted from the remaining pulp, and if a greater pressure is used in making the determinations, that there was exhibited too great a tendency to press the pulp of the vegetables through the press with the juice or moisture of the peas.

I have found in my experimenting that a good grade of peas would yield forty cubic centimeters of juice per twelve ounce sample, and that peas which will produce forty cubic centimeters of juice will rate as quality peas when canned. It is therefore possible to fix a base price for the peas grown and delivered to the packing house upon a basis of peas which will produce forty cubic centimeters of juice or moisture from a twelve ounce sample. Peas which vary from the standard thus fixed of yielding forty cubic centimeters of juice or moisture for twelve ounces of peas are then determined in price as to how much over, or how much under, the juice content runs. For example, if the juice content runs a cubic centimeter over the required forty cubic centimeters for twelve ounces of peas, the price will be above the base price fixed for the standard arrived at. If the peas yield less than forty cubic centimeters of juice or moisture content, the price will be less than the base price fixed for the standard peas at so much per cubic centimeter of juice less than the standard fixed.

In making all tests for the standardization of peas, shelled peas are employed. In a canning plant, by properly maintaining the standard of the peas packed by the foregoing method, a very uniform pack may be had to a degree not heretofore possible.

The apparatus that I prefer to employ for carrying out my invention is as heretofore set forth fully disclosed in my co-pending application Serial No. 432,760. In the drawing I have diagrammatically illustrated this apparatus as including a cylinder 1 which is provided at its lower end with a screen 2 upon which the peas or vegetables to be tested are mounted. A plunger 3 is mounted in the cylinder 1 and is adapted to be actuated to exert upon the peas a definite predetermined pressure. Mounted below the screen 2 is a container 4 having graduations 5 thereon enabling the immediate determination of the volumetric yield of juice or moisture of the vegetables or peas being tested. Many diverse forms of plunger actuating means may be employed, the preferred form of which is fully disclosed in my co-pending application above referred to, and includes a screw stem 6 which is connected to the plunger 3. The screw stem 6 is threaded into a sleeve 7 and the screw stem 6 is held from rotation by any suitable or desirable means. Secured to the sleeve 7 is a hand-wheel 8 which is rotated for the purpose of rotating the sleeve 7 relative to the stem 6 to thereby cause the stem 6 to travel either upwardly or downwardly, depending upon the direction of rotation of the wheel 8.

The sleeve 7 is mounted in position in such a manner as to determine the maximum pressure which can be exerted on the plunger 3 by rotation of the handle 8. This maximum pressure may be adjusted if desired by means of a variable weight mounted in the means supporting the sleeve 7. The form of connection herein provided is fully disclosed in my copending application so that it is believed unnecessary to herein specifically define this construction, the essential features being that a connection is provided which enables the maintaining of a definite pressure being exerted by the plunger 3 against the vegetables or peas mounted in the cylinder 1, and that if desired this maximum pressure may be adjusted to take care of the optimum conditions of operation for standardizing different vegetables. The weights used for adjusting the maximum allowable pressure are carried by the balance arms 9 and are indicated at 10. The weights are adjusted by moving the same either inwardly or outwardly along such balance arms as they are adjustably supported on pins 11 which may be fitted into any one of a series of holes 12 carried by such balance arms.

Having fully described my invention, it is to be understood that I am not limited to the precise form of my invention herein set forth which is set forth merely for the purpose of giving an illustrative example of the use of my method of determining or standardizing vegetables, nor to the specific apparatus herein defined or referred to, but that my invention is for the full scope of the appended claims.

I claim:

1. The method of testing those vegetables in which the juice content constitutes an index of quality, comprising subjecting a sample of vegetables of a standard constant weight to a standard constant pressure thereby extracting juice from the vegetable, and comparing the amount of juice so extracted to the amount of juice representing the standard of quality fixed for such vegetable.

2. The method of testing peas in which the juice content constitutes an index of quality, comprising subjecting a sample of peas of a standard constant weight to a standard constant pressure thereby extracting juice from the peas, and comparing the amount of juice so extracted to the amount of juice representing the standard of quality fixed for the peas.

Signed at Springville, Utah, this 16 day of Dec., 1930.

WILLIAM R. EDDINGTON.